Dec. 27, 1966  JEAN-BAPTISTE ROCH ETAL  3,294,265
ARRANGEMENT FOR CLEANING OUT THE BOTTOM
OF REFUSE BINS OR THE LIKE CONTAINERS
Filed March 23, 1964  5 Sheets-Sheet 1
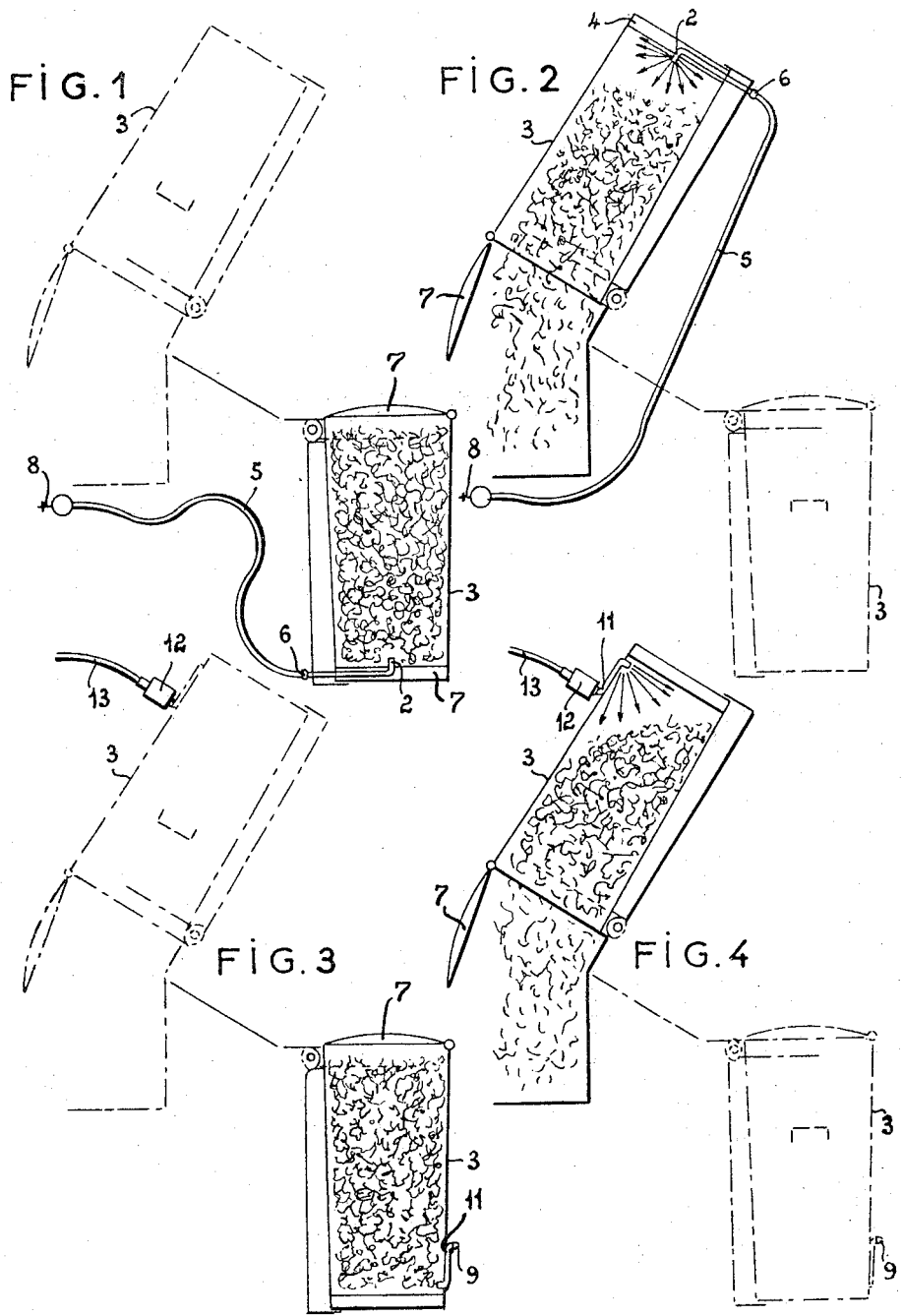
INVENTORS
JEAN-BAPTISTE ROCH
JEAN JOSEPH ROCH
By Irvin S. Thompson
ATTORNEY INVENTORS
JEAN-BAPTISTE ROCH
JEAN JOSEPH ROCH
BY Irvin S. Thompson
ATTORNEY

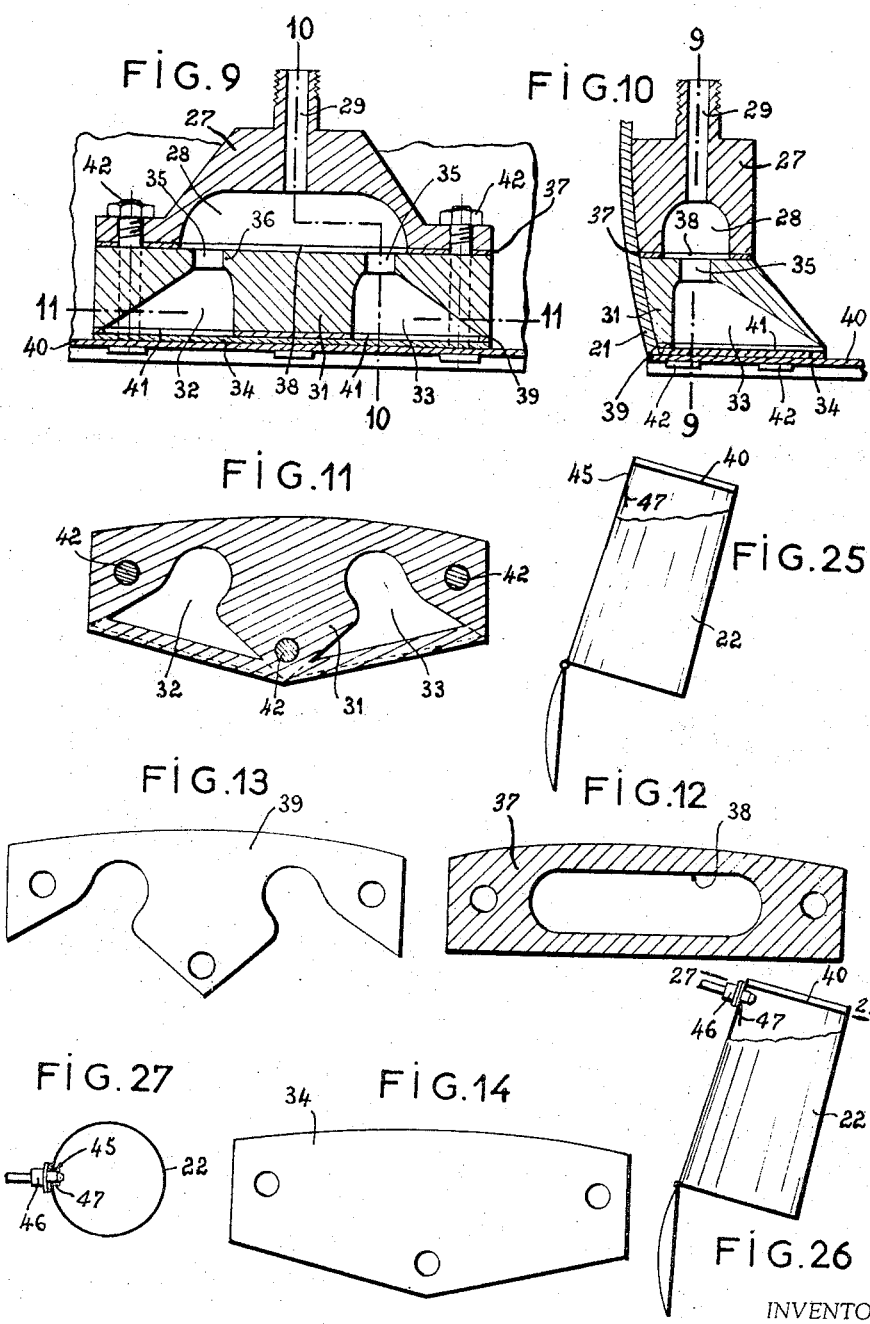

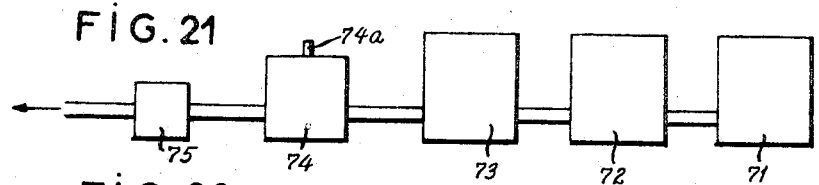
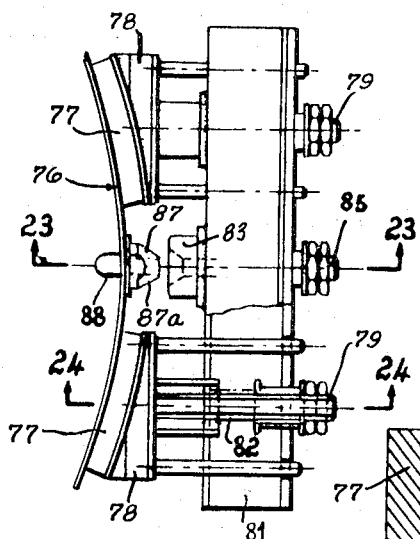
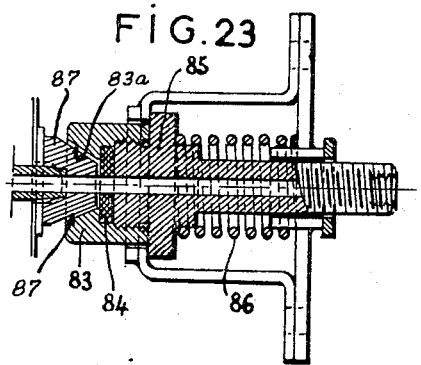
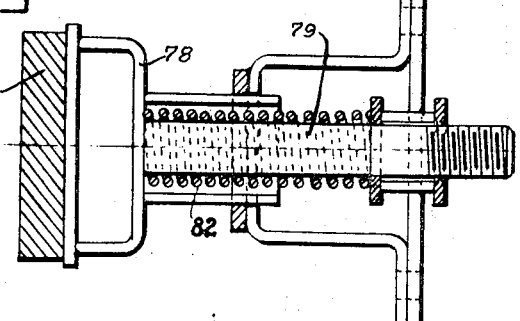
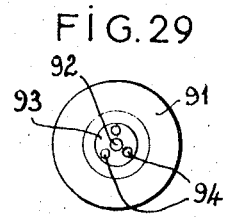
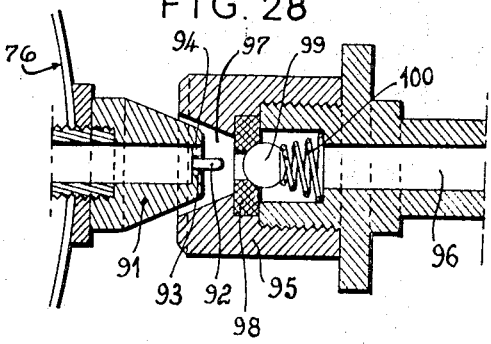
INVENTORS
JEAN-BAPTISTE ROCH
JEAN JOSEPH ROCH
BY Irvin S. Thompson
ATTORNEY

United States Patent Office 3,294,265
Patented Dec. 27, 1966

3,294,265
ARRANGEMENT FOR CLEANING OUT THE BOTTOM OF REFUSE BINS OR THE LIKE CONTAINERS
Jean-Baptiste Roch, 20 Blvd. des Tchecoslovaques, and Jean Joseph Roch, 6 Rue Tramuset, both of Lyon, France
Filed Mar. 23, 1964, Ser. No. 354,053
13 Claims. (Cl. 214—310)

The collecting of refuse under sealed conditions consists in removing the refuse previously deposited in closed refuse-bins, while preventing any dust from escaping. At the present time, this is achieved by loading into a dump truck through a trap door the refuse contained in suitable bins provided with a cover.

This operation is performed as follows: the refuse bin is hung by a scavenger on an elevator located at the rear of the truck. Said elevator, which is actuated by hand, pneumatically or hydraulically, reverses the refuse bin after tilting it angularly. The bin opens, releases the refuse contained therein into the truck, closes again and then returns to its starting position to be removed and returned to the place from which it had been withdrawn.

Such a method is not as satisfactory as it would seem, since the dumping of the refuse is not complete. If the covers of the emptied refuse bins are raised, it will be seen that most of the bins still contain rubbish stuck to the bottom thereof, which leads to a premature oxidation of the metal, to the proliferation of microbes and to a release of objectionable smells. It is then absolutely necessary to wash the bins, especially in the case of refuse bins containing more than 100 litres on account of their considerable depth and of their conicity which is inadequate for a continuous dumping.

In practice, in all large cities provided with thousands and thousands of refuse bins, a washing of all the bins at a predetermined location would lead to the necessity of having a double set of refuse bins, the price of which is comparatively high, and to additional transportation and handling. A washing in situ, which is possible in recently-erected buildings, is no longer possible in older buildings where the housing of the bins is already a difficult problem.

These drawbacks have not escaped the notice of the builders of refuse-collecting trucks, but a complete emptying of the bins cannot be achieved mechanically because the upending of the bins through an angle of 50 to 55° cannot be raised to a value of 90° on account of the very structure of the mechanical system. The application of shocks to the bins is not rational, nor is a vibratory system, taking into account the noise this would produce. As to the increase in the conicity of the containers, this would lead to a greater bulk and to a more expensive construction without resulting in a perfectly satisfactory emptying.

The arrangement for completely cleaning out the bottom of the refuse bins according to this invention aims at obviating such drawbacks. To this end, the nozzle of at least one injector is positioned at the bottom of the bin or on the periphery thereof so as to introduce into the bin a pressurized fluid, whereby the violent expansion of the jet of said fluid tears off and sweeps away the rubbish and refuse amalgamated on the walls of the bin while quickening at the same time the rate of emptying of the bin contents.

Said pressurized fluid may be introduced at different points along the bottom and periphery of the bin by means of at least one injector or of a plurality of injectors arranged at different angles and provided, if required, with deflectors, said injectors operating simultaneously or otherwise.

The fluid injected may be compressed air from a pressurized container, or from a pump, compressor or the like; alternatively, said fluid may be a liquid.

In an embodiment of the invention, the blowing nozzle, which has a profiled back matching the curve or the slope of the inner wall of the refuse bin to the lower end of which it is secured, is an assembly of the following elements:

An upper element, the base of which forms an open receiver and expansion chamber into which the pressurized fluid is introduced through a supply-pipe;

A lower element including at least one open distributing chamber communicating with the receiving chamber and partly closed by a bottom plate;

An intermediate fluidtight joint clamped between the upper and lower above-mentioned elements and provided with a single opening or gauged port formed therein at right angles with the channel leading to each distributing chamber;

A bottom plate closing the lower ends of the distributing chambers and clamping against their edges a fluidtight joint cut out so as to leave open the lateral output ports for the fluid directed towards the bottom of the refuse bin, the amount of fluid admitted being controlled by the cross-section of the ports provided in the intermediate joint for interconnecting the receiving and distributing chambers, while the amount of the distributed fluid is controlled by the thickness of the joint clamped by the bottom plate against the distributing chambers.

In order to avoid the necessity of a manual connection by means of a flexible hose, the end of the tube extending along the lateral wall of the bin and passing radially through it may be constituted by a male frusto-conical connector which, when the bin is placed on the cradle of the elevator and is raised by the latter, penetrates into a corresponding female conical connector carried by the elevator and connected through a hose with the compressed air line, the conicity of said two connectors and the arrangement of a resilient packing in the bottom of the female mouthpiece ensuring the fluidtightness required for such a connection, while a cam synchronized with the elevator or an adjustable stationary stop controls the opening of a valve, whereby the compressed air is released, the closing of said valve being controlled by a time-lag device or a time-switch.

The invention will be readily understood from the following description, with reference to the appended diagrammatic drawings illustrating by way of example and by no means in a limiting sense several embodiments of the arrangement of the invention and of the equipment required for the operation thereof. In said drawings:

FIGURES 1 and 2 show a refuse bin fitted with an injector positioned at the bottom thereof and illustrated respectively prior to the lifting of the bin and during the dumping thereof;

FIGURES 3 and 4 are similar views in the case of a modification according to which the injector is located at the periphery of the refuse bin close to the bottom of the latter;

Figure 6:
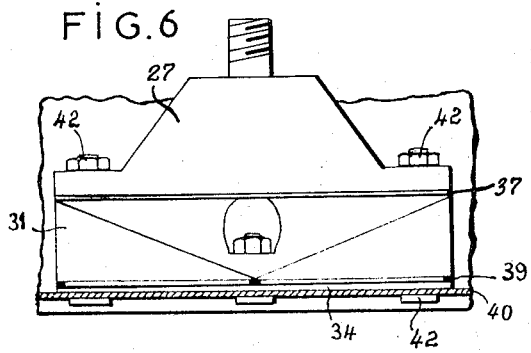
Figure 7:
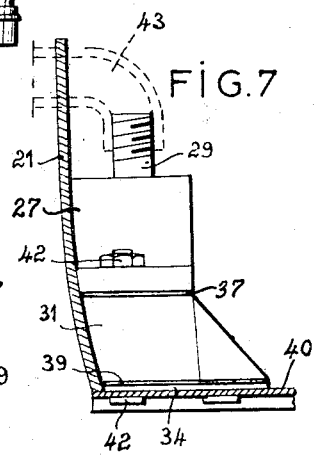
Figure 8:
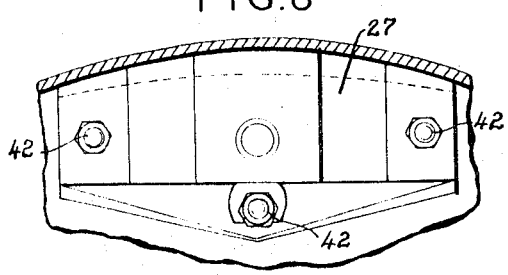
Figure 30:
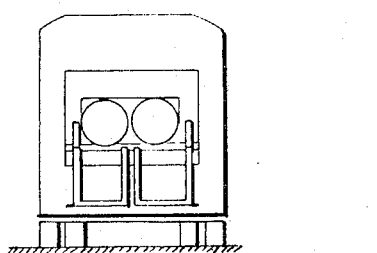
Figure 15:
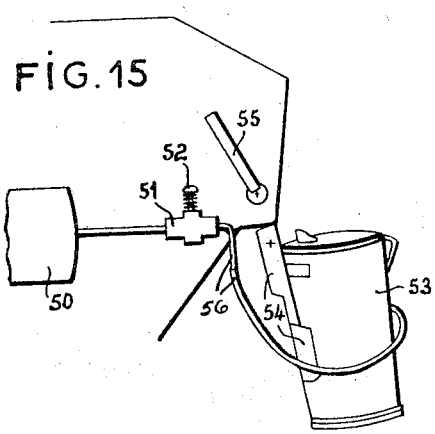
Figure 16:
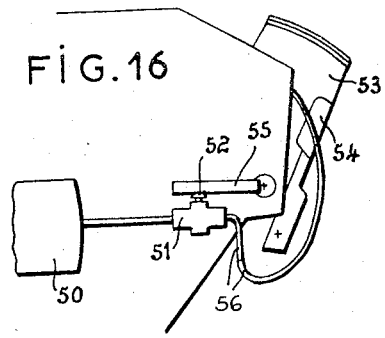
Figure 17:
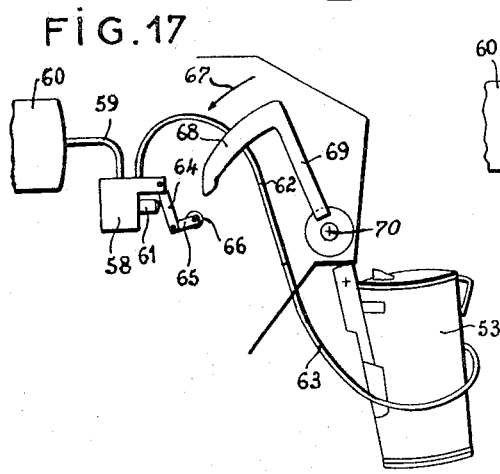
Figure 18:
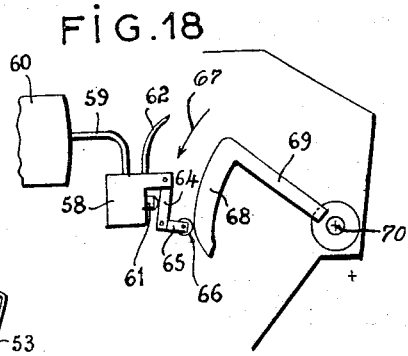
Figure 19:
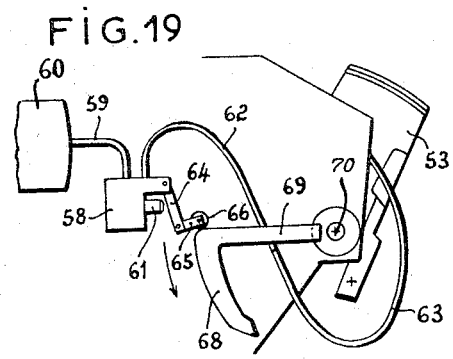
Figure 20:
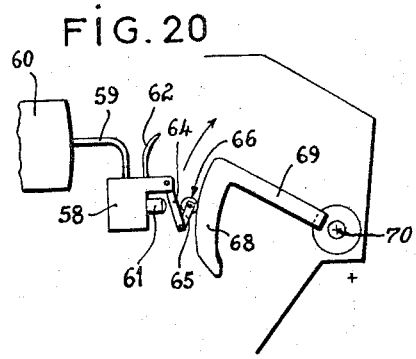

FIGURES 6, 7, and 8 show on an enlarged scale the blowing nozzle, respectively in front elevational view, in side view and in plan view;

FIGURES 9 and 10 are vertical cross-sections of said nozzle, respectively through lines 9—9 of FIG. 10 and 10—10 of FIG. 9;

FIGURE 11 is a horizontal cross-section through line 11—11 of FIGURE 9;

FIGURES 12 and 13 are plan views of the intermediate and lower fluidtight joints;

FIGURE 14 is a plan view of the plate closing the bottom of the arrangement;

FIGURES 15 and 16 illustrate a mechanical control of the exhaust valve, respectively when inoperative and when operative;

FIGURES 17 to 20 show an arrangement of the admission valve controlled mechanically for a predetermined time, said valve being thus illustrated respectively when inoperative, during its opening, during its closing and while it returns to its inoperative position;

FIGURE 21 illustrates the compressed air equipment carried by a vehicle according to the arrangement of the invention;

FIGURE 22 is an elevational, partly sectional view of the cradle of the elevator;

FIGURES 23 and 24 are, on an enlarged scale, sectional views respectively through lines 23—23 and 24—24 of FIGURE 22;

FIGURES 25 and 26 are, in a modified embodiment, partly sectional views of an overturned bin, respectively before and after the insertion of the cleaning out device;

FIGURE 27 is a cross-section through line 27—27 of FIGURE 26;

FIGURE 28 is a longitudinal section of a device for delivering compressed air, the automatic obturation of which is controlled by the positioning of the air-inlet member on the bin;

FIGURE 29 is a front view of said air-inlet member;

FIG. 30 shows the rear end of a refuse-collecting vehicle provided with two dumping openings for two bins.

According to a simplified embodiment of the invention, shown in FIGURES 1 and 2, the injector 2 opens into the refuse bin 3 near the bottom 4 of the latter through which it extends. Said injector may be provided with several outlet ports opening in different directions and in different planes, that is, some of them opening downwardly and the others upwardly.

After hanging the refuse bin on the elevator, the operator connects, by means of a hose 5, a supply of compressed air through the connection 6 conveying the air to the injector 2 in the bin. The starting of the elevator leads to a rotation of the bin 2 up to the point at which it is emptied and at the end of said travel the cover 7 of the bin opens.

When the bin is completely open and ready to dump its contents as illustrated in FIGURE 2, the operator opens during the required time the cock 8 which controls the input of air into the hose 5 connected to the injector 2. On opening of said cock, once or several times, the ports of the injector start working and project inside the bin violent jets of air, the expansion of which drives outwardly the refuse still adhering to the walls and the bottom of the bin.

After turning off the cock 8 again and also closing the cover 7, the bin 3, which is now empty, returns in a reverse direction over the same path and comes to a stop in its lowermost position on its support, so that the operator can disconnect the hose 5 from the connection 6 of the injector. The bin 3 is then free and may be returned to the spot where it was standing previously.

According to a modified embodiment, the injection of air or fluid may be controlled automatically instead of being controlled manually. To this end, the bin 3 is fitted with an inlet connection 9 located at a point 11 on the periphery of the outer wall of the bin, as shown in FIGURES 3 and 4, so that, when the bin reaches its emptying position, said connection penetrates automatically a connecting member 12 which connects it with the end of the input line 13 feeding the compressed fluid under the control of an automatically operated cock; various solutions may be provided for such a control: the opening of said cock at the end of the travel of the bin may be controlled mechanically or electrically through the cover of the bin upon reaching its emptying position; or else, it is possible to arrange the meeting of the connection 9 with the connecting member 12 in a manner such that it produces automatically the opening of the cock controlling the admission of compressed fluid.

Figure 5:
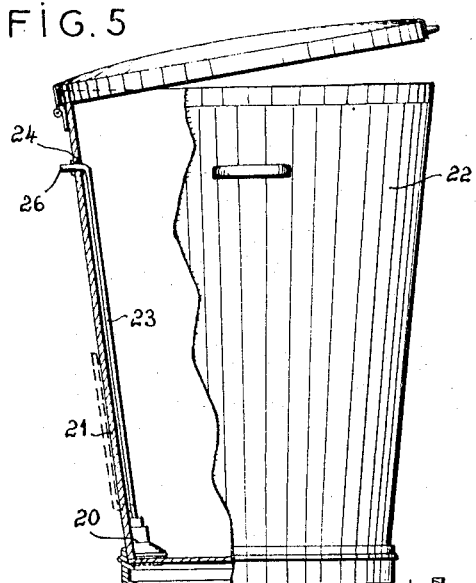
FIGURE 5 is an elevational, partly sectional, view of a lidded refuse bin incorporating the arrangement of the invention.

As shown in FIGURE 5, the blowing nozzle is secured at 20 to the lower end of the inner side wall 21 of a refuse bin 22. Its back is shaped so as to match that of said wall. A supply-tube 23 for the pressurized fluid extends along said wall in an upward direction so as to pass through it at 24 at a predetermined height in order that the end of the conduit feeding the compressed fluid may be readily and conveniently connected with the end 26 of said tube 23.

In said embodiment, for convenience in manufacture of the nozzle, the latter includes, as shown in FIGURES 6 to 14, the following component parts:

An upper element 27 comprising a distributing chamber 28 into which opens the line 29 feeding the fluid the expansion of which takes place in said chamber;

A lower element 31 comprising two distributing chambers 32 and 33 connected each with the chamber 28 of the element 27 through an opening 35 provided in its wall 36;

An intermediate fluidtight gasket, as shown in FIGURE 12 at 37, which gasket is inserted between the two elements 27 and 31 and is provided with a gauged hole 38 which forms a communication between the chamber 28, on the one hand, and the chambers 32 and 33, on the other hand;

A closing plate 34 (FIGURE 14) for the lower distributing chambers, which plate presses against the lower surface of the lower element 31 a gasket 39 (FIGURE 13) of which the periphery is cut out in a manner such as to leave free the outlet opening for the fluid directed towards the vicinity of the bottom 40 and the side wall of the bin. By changing the thickness of said gasket, it is easy to modify in either direction the height of the slots 41 (FIGS. 9 and 10) through which the fluid escapes for cleaning out all the material agglomerated in the bottom part of the bin 22.

According to a modification, the tube 23 may be located not inside but rather outside the bin in contact with the outer surface of its wall. In such a case, with a view to passing through the wall 21, the line 29 feeding the pressurized fluid is extended by means of an elbow connection 43. Alternatively, the line 29 may extend horizontally and pass through the wall without any elbow connection being required.

Instead of being uncovered outside or inside the bin, the tube 23 may as well be cast or machined within the thickness of the wall 21, and the same holds good in respect of all or part of the blowing nozzle 20.

The pressurized fluid, such as compressed air, is supplied to the line 29 through a manually or automatically controlled device of any suitable type. Said air, when suitably guided, expels all the material adhering inside the bin to the bottom 40 and the side wall thereof.

Bolts 42 hold assembled the different component parts of this blowing nozzle and at the same time they secure the latter to the bin bottom 40 through which they pass.

In a modification, the volume of fluid admitted for expelling the refuse from the bin may be adjusted by the following means: the opening 35 and the channel through which the air passes may be given a very large cross-section and the adjustment may be ensured by changing as required the intermediate gasket 37. In such a case, however, the latter should be perforated only above each opening 35 so as to form a gauged port. To vary the output of fluid thus, it is sufficient to replace the intermediate gasket by another gasket provided with gauged ports of a different cross-section.

Such a nozzle can also serve for washing the refuse bin and to this end it is only necessary to connect the end 26 of the line 23 with means supplying a liquid under pressure, so that the latter may be introduced and distributed over the bottom of the bin in the same manner as compressed air.

As illustrated in FIGURE 21, the automatically operated means for producing compressed air on board a refuse-collecting vehicle should include a compressor 71, a purifier 72, a container 73, a distributing valve 74 and preferably a time-lag device 75 or the like adapted to cut off the supply of compressed air.

The elevator of the vehicle which effects the tilting of the bins for their emptying includes, in addition to the means for engagement with the upper edge of each bin, a cradle bearing against its lateral walls.

In the embodiment illustrated in FIGURE 22, said cradle includes two rests or supports 77 which are concave so as to match the outline of the side wall 76 of a bin and are carried by two pistons 78 of which the rods 79 slide inside a common support 81 carried by the elevator provided on the vehicle. As shown in FIGURE 24, helical springs 82 engaging on the one hand the pistons 78 and on the other hand the support 81 normally hold the supports 77 in their position remote from said support 81.

At the center of said support 81, that is between the two pistons 78, is fitted the female conical connector 83 which forms the end of the compressed air line of the vehicle. Said connector 83 carries at the bottom of its frustoconical bore 83a, as shown in FIGURE 23, a resilient fluidtight packing 84 which is held in position by clamping between the connector 83 proper and a member 85 connected with a hose (not shown in the drawing). The whole system including the connector 83, the packing 84 and the member 85 is mounted elastically on the support 81 through the agency of a helical spring 86 bearing on the one hand on a shoulder on the member 85 and on the other hand on said support 81. This system may thus be shifted axially, its axial movements being resisted by the spring 86.

A male conical connector 87 matching the female connector 83 is secured radially to the side wall 76 of the bin and is connected with the injector (which is not illustrated in the drawing) by a tube 88 extending along said side wall inside the bin, as illustrated, or outside it.

In order to effect the emptying of the refuse bin, the operator lays the latter on the cradle of the elevator, as illustrated in FIGURE 22. When the elevator tilts the bin, the weight of the latter bearing on the supports 77 causes the pistons 78 to recede, their movements being resisted by the springs 82.

The bin 76 is laid on the cradle in such a manner that, at the end of the above-mentioned receding movement, the male conical connector 87 penetrates into the female conical connector 83 until it comes to bear on the packing 84. The conical outlines 83a and 87a of the connectors 83 and 87, associated with the elasticity of the packing 84, ensure a perfectly fluidtight connection between the tube 88 and the compressed air line on board the vehicle.

The elastic securing of the female connector 83 to the support 81 eliminates any risk of damaging the connectors 83 and 87 as a consequence of a possible shock.

If the supports cannot be retained on the above arrangement on account of a lack of sufficient room for their accommodation, it is possible to secure the female connector to a pivoting carrier, to a spring or to a swivel adapted to assume any required angular setting through mere engagement of the male conical connector on the bin at the moment of the dumping of the latter. The fluidtight connection between the injector inside the bin and the supply of compressed air on board the vehicle being thus ensured, it is sufficient to open the feed of compressed air at the suitable moment and for the period of time required for the emptying operation.

In a preferred embodiment of such an arrangement, the control of said feeding is ensured by a valve arranged above the female connector 83 and adapted to be actuated by a cam of which the drive is synchronized with the drive of the elevator, or by an adjustable stationary stop rigid with the vehicle and against which a control finger abuts.

As illustrated in FIGURES 15 and 16, an exhaust valve 51 controlled by a push member 52 may be actuated mechanically. The apparatus being inoperative, as shown in FIGURE 15, the bin 53 is laid on the elevator 54 while the push member 52 is released by the control means 55. When the bin reaches the end of its tilting movement (see FIGURE 16), the push member 52 depressed by the control means 55 opens the valve 51 so as to release the compressed air which flows through the line 56 and expands in the bottom of the refuse bin 53 in order to clean it out.

The beginning of the return of the bin 53 to its inoperative position releases the push member 52 and closes the valve 51.

The cutting off of the feed of compressed air is performed preferably by means of a time-lag device 75 or a time switch fitted between the valve 74 and the female conical connector 83, as shown in FIGURE 21.

It is also possible to cut off said feed automatically without it being necessary to wait for the return of the bin to its inoperative position after the contents thereof have been removed. This result may be obtained, for instance, by actuating the control valve by a device which collapses after the required operation is ended. Such an arrangement is illustrated in FIGURES 17 to 20 and may be constituted as follows:

The valve 58 is fed with compressed air from the air container 60 through the line 59. The push member 61 controls the flow of said air towards the injector inside the bin through the line 62 connected with the hose 63. Said push member may be actuated by the pressure exerted by the lever 64 which bears against it under the action of the further lever 65 rocking at the free end thereof and carrying preferably a cam follower 66 at its free end. Said lever 65 is shifted towards the push member 61 upon passage of a cam 68 in the direction of the arrow 67, said cam being secured to the end of a lever 69 adapted to rock at 70 simultaneously with the drive of the bin elevator.

After the cam 68 has passed (see FIGURE 19), the push member 61 is released and closes the valve 58. During its return to its inoperative position (see FIGURE 20), the heel of the cam 68 retracts the cam follower 66 by lifting the lever 65, so that said cam does not actuate the push member 61 during its passage in this reverse direction.

According to a modification of said arrangement controlling the duration of introduction of compressed air, the cam follower 66 is not collapsible, in which case, upon returning to its inoperative position the cam 68 actuates again the push member 61, so that compressed air is fed again into the bin as long as the roller 66 has not been completely released by the cam 68.

In the embodiments described hereinabove, each refuse bin has to be provided with individual means for emptying or washing purposes. However, according to a further modification, said means may be provided in or near the bottom of the refuse bin only during the period of actual use of said arrangement.

To this end, close to the bottom of the bin 22 the side wall of the latter is provided with an opening 45, as illustrated in FIGURES 25 to 27, which allows introducing into the bin the device 46 integral with the refuse-collecting vehicle. Except at the moment of the emptying or washing of the bin, said opening 45 is closed by a flap 47 pivotally secured to the wall of the bin and which is pushed back by said device 46 when the latter is introduced into the bin.

The driving means for the valve or the cock controlling the pneumatic system may depend on the arrangement selected for the dumping opening fitted on the vehicle. They may include or not retractable rollers, push members, driving levers or electromagnetically actuated levers.

Alternatively, said automatic control of the pressurized fluid may be effected by means of two connectors, male and female respectively. Said arrangement is illustrated in FIGURES 28 and 29.

At the lower end of the side wall 76 of the refuse bin is secured the body 91 of the hollow male connector having a conical outline and provided with a projecting lug 92 integral therewith. Its support may be a disc 93 at the center of which it stands and which is provided with a plurality of holes 94 for the passage of the blown air.

The hollow female connector 95 of which the channel 96 is connected wtih the source of pressurized air is fitted to the frame of the dumping opening on the vehicle. Its body includes a conical bore 96 adapted to accommodate the male conical connector 91. The bottom of said bore is closed by a ring 97, preferably made of a resilient material such as, for instance, a plastic material, the central opening of said ring being closed by a ball 99 held in position on its seat by the spring 100. The emission of compressed air will thus last as long as the lug 96 introduced into the female connector 95 through the movement of the bin 76 moves ball 99 from its seat on the ring 97.

Whatever solution is resorted to, the operation of the automatic device of the invention includes the following stages:

Engagement of the bin on the refuse-collecting vehicle and raising of said bin;

Positioning of the means for introducing the compressed air and leading it to the injector after opening of the bin cover;

Opening of the valve;

Closing of the valve and then of the cover of the bin; and

Lastly, downward movement of the empty bin and return of the latter into its inoperative position.

Any of the cleaning out devices described hereinabove may serve for equipping a refuse bin or the like container to be emptied into the body of a vehicle fluid tightly collecting the refuse and provided with one or two openings controlled individually, whether automatically or manually, whatever may be the transverse outline of the container to be emptied, whether circular, rectangular, oval or the like.

Obviously, the invention is by no means limited to the embodiments thereof more particularly described hereinabove and it is possible, for instance, to modify, within the scope of the accompanying claims, the location and the number of injectors and also the number of the component parts thereof and their distribution at the bottom of the bin or along the periphery of said bottom, as well as the location of the air-inlet member.

What we claim is:

1. Apparatus for cleaning out refuse bins or the like containers, comprising a vehicle, cradle means for receiving and supporting a container, means mounting the cradle means for vertical swinging movement on the vehicle to upend a container thereon to place the container in dumping position, means carried by the vehicle for applying fluid under pressure to at least the bottom of the inside of the container, and means responsive to movement of the container to said dumping position to actuate said applying means.

2. Apparatus as claimed in claim 1, and a receptacle carried by the vehicle and substantially larger than said container to receive material dumped from said container, said vertically swinging means being in unitary assembly with said receptacle.

3. Apparatus as claimed in claim 1, said applying means extending through a wall of the container.

4. Apparatus as claimed in claim 1, said responsive means having means contacted and moved by a portion of said vertically swinging means to actuate said applying means.

5. Apparatus as claimed in claim 1, said responsive means having means contacted and moved by a portion of the container to actuate said applying means.

6. Apparatus as claimed in claim 1, said container having first connector means thereon having a first passageway therethrough for said fluid under pressure, said applying means having second connector means thereon having a second passageway therethrough for said fluid, said first and second connector means mating with each other when said container is in said dumping position and being separated from each other when said container is in a position other than said dumping position.

7. Apparatus as claimed in claim 6, said first and second connector means including valve means movable to open position by contact between said first and second connector means to admit fluid under pressure to the interior of the container.

8. Apparatus as claimed in claim 1, and time-lag means for deactuating said applying means upon the expiration of a predetermined period of application.

9. Apparatus as claimed in claim 1, said container having first connector means thereon having a first passageway therethrough for said fluid under pressure, said applying means having second connector means thereon having a second passageway therethrough for said fluid, said first and second connector means having male and female conical parts mating with each other when said container is in said dumping position and being spaced from each other when said container is in a position other than said dumping position.

10. Apparatus as claimed in claim 9, the bottom of said female conical part having a resilient gasket thereon for ensuring fluid tightness.

11. Apparatus as claimed in claim 10, and time-lag means for deactuating said applying means upon the expiration of a predetermined period of application.

12. Apparatus as claimed in claim 1, said applying means comprising an injector positioned in the bottom of the container, said injector having an upper element the base of which forms an open receiving and expansion chamber, a supply conduit for introducing pressurized fluid into said receiving chamber, a lower element having at least one open distributing chamber communicating with the receiving chamber, a bottom plate partly closing said distributing chamber, an intermediate fluid-tight joint clamped between said upper and lower elements and having a gauged port therethrough at right angles to the path of communication between said receiving chamber and said distributing chamber, and a lower fluid-tight joint clamped against the edges of the distributing chamber by said bottom plate, said lower fluid-tight joint being recessed so as to leave open a lateral outlet for fluid from said distributing chamber.

13. Apparatus as claimed in claim 1, the container having a flap closing an opening in a wall thereof and that swings within the container, the applying means having an outlet that pushes back said flap and enters said opening when the container reaches said dumping position.

References Cited by the Examiner

UNITED STATES PATENTS

| | | | |
|---|---|---|---|
| 1,619,297 | 2/1927 | Hackley | 302—53 |
| 1,789,050 | 1/1931 | Ochsner | 214—303 |
| 1,903,605 | 4/1933 | Allen | 251—339 X |
| 2,353,346 | 7/1944 | Logan | 222—1 |
| 2,570,070 | 10/1951 | Palmer | 214—310 |
| 2,592,085 | 4/1952 | Van Doorne | 214—302 |
| 2,735,725 | 2/1956 | Galle | 214—302 |
| 2,741,797 | 4/1956 | Britton | 214—310 X |
| 2,850,785 | 9/1958 | Rushing | 25—120 |

HUGO O. SCHULZ, *Primary Examiner.*

GERALD M. FORLENZA, *Examiner.*

A. GRANT, *Assistant Examiner.*